Patented Dec. 27, 1932

1,892,167

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

PLASTIC COMPOSITION AND METHOD OF MAKING SAME

No Drawing. Application filed April 12, 1928, Serial No. 269,605. Renewed May 19, 1932.

This invention relates to plastic compositions and particularly to a plastic adhesive made by fluxing ester gum or similar resinous bodies of a somewhat brittle consistency with rubber which has been previously vulcanized, in such proportions as to give a soft, smooth, permanently plastic product. These compositions are preferably characterized by approximately equal parts of ester gum and of vulcanized rubber, although these proportions may vary widely to produce products of varying properties. I have found that soft, smooth, permanently plastic products may be satisfactorily obtained with from 40 parts to 150 parts by weight of vulcanized rubber to 100 parts of ester gum.

These permanently plastic products are readily miscible in all proportions with the ordinary organic solvents, or mixtures thereof, and I preferably employ a mixture of a so-called rubber solvent and a so-called resin solvent.

In one embodiment of my invention, equal parts by weight of ester gum and of ground inner tube scrap are heated together for six hours at 350° F. in an auto clave. The resulting product is a smooth plastic mass which can be used in this form as an adhesive or as a plastic filler, or which may be mixed with organic solvents to produce a spreadable composition of any desired consistency. As is hereinabove indicated, when solvents are to be added, mixed solvents are preferable, such for example as a mixed solvent comprising ⅔ rubber solvent, like gasoline, and ⅓ resin solvent, like acetone. It is to be understood, however, that satisfactory spreadable compositions can be made with any quick-drying organic solvent.

In another embodiment of my invention equal parts of ester gum, of ground inner tube scrap, and of clay are mixed on a rubber mill and then heated for six hours at 350° F. This gives a somewhat stiffer plastic material which is well adapted for use as a putty or plastic filler. It may, however, be thinned with organic solvents as in the preceding example and the pigment content may be augmented by the addition of finely powdered solids in relatively large amounts.

The products of this application may also be prepared in an internal mixer and may even be made in an open vessel. The temperature to which the mixed ester gum and rubber is heated varies widely, but should be sufficiently high to flux one in the other to form a smooth material. Where an internal mixer is employed, the heat of mixing may be sufficient to effect this result. Moreover, softeners as well as pigments, fillers, etc., may be added to the ground scrap and ester gum mixture at any stage in the process of preparation, and rosin, para-coumarone, kauri, aldol alpha-naphthylamine and like gums may be substituted in whole or in part of the ester gum of the above example.

The term "permanently plastic" as herein used defines the property of the novel materials described herein whereby upon standing exposed to the air for extended periods, such as several months, they do not harden as do the constituent materials from which these plastics are made.

It is obvious that numerous modifications and variations of my invention within the scope of the foregoing specification may be made without departing from the principles thereof and I consequently do not intend to limit the invention except as may be required by the prior art.

What I claim is:

1. The method of preparing a plastic adhesive composition which comprises fluxing a brittle resinous material with vulcanized rubber in substantially equal proportions by weight.

2. The method of preparing a plastic adhesive composition which comprises fluxing ester gum with vulcanized rubber in proportions ranging from 40 to 150 parts by weight of vulcanized rubber to 100 parts of ester gum.

3. The method of preparing a plastic adhesive composition which comprises fluxing a resinous material with vulcanized rubber in substantially equal proportions by weight, and intimately admixing with the plastic thus formed organic solvent.

4. The method of preparing a plastic adhesive composition which comprises fluxing ester gum with vulcanized rubber in proportions ranging from 40 to 200 parts by weight of vulcanized rubber to 100 parts of ester gum, and intimately admixing with the plastic thus formed quick-drying organic solvent of the class consisting of gasoline, benzol, carbon-tetrachloride, acetone or mixtures thereof.

5. A soft, smooth permanently plastic material comprising ester gum fluxed with vulcanized rubber in proportions ranging from 40 to 150 parts by weight of vulcanized rubber to 100 parts of ester gum.

6. A spreadable composition composed of smooth permanently plastic material comprising ester gum fluxed with vulcanized rubber in proportions ranging from 40 to 150 parts by weight of vulcanized rubber to 100 parts of ester gum and mixed with organic solvents.

7. The method of preparing a plastic adhesive composition which comprises fluxing a brittle resinous material with vulcanized rubber in proportions ranging from 40 to 150 parts by weight of vulcanized rubber to 100 parts of the resin.

In witness whereof I have hereunto set my hand this 9th day of April, 1928.

WALDO L. SEMON.